April 4, 1967
C. T. BANKS
3,312,324
PAPERMAKING MACHINE
Filed April 15, 1966
3 Sheets-Sheet 1
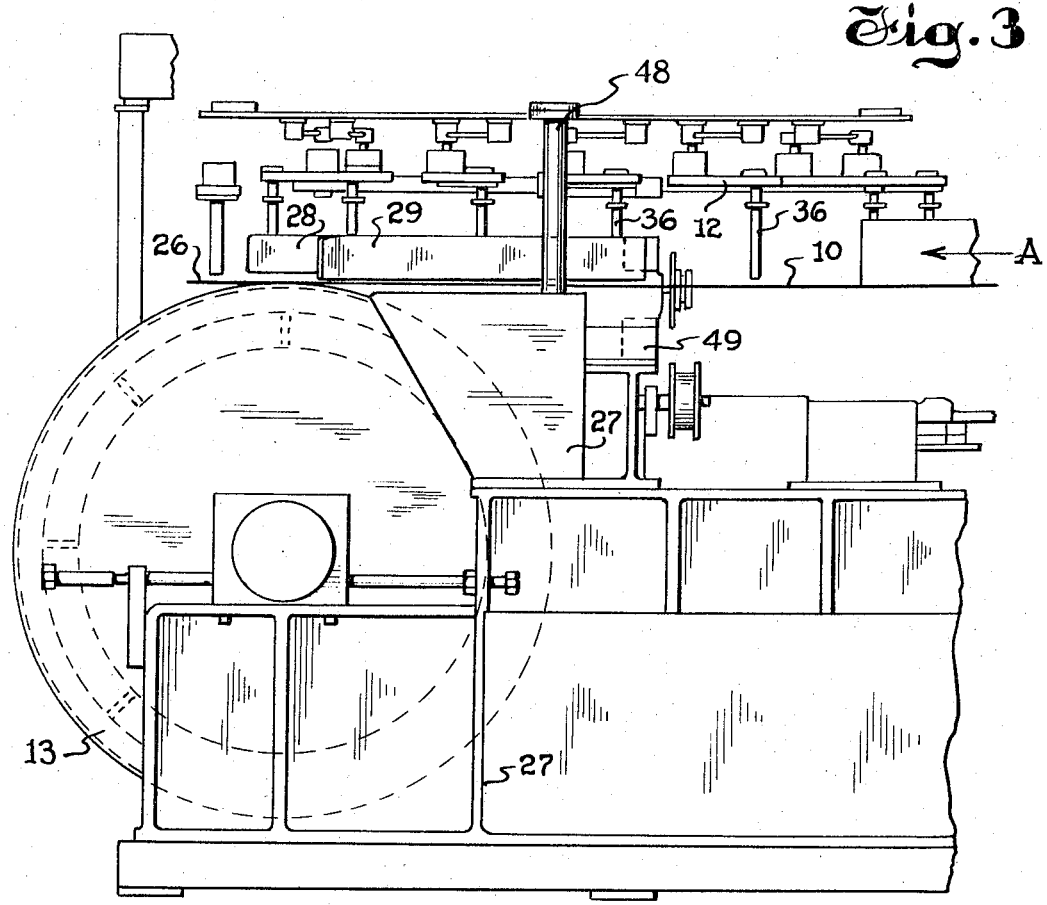
Fig. 3
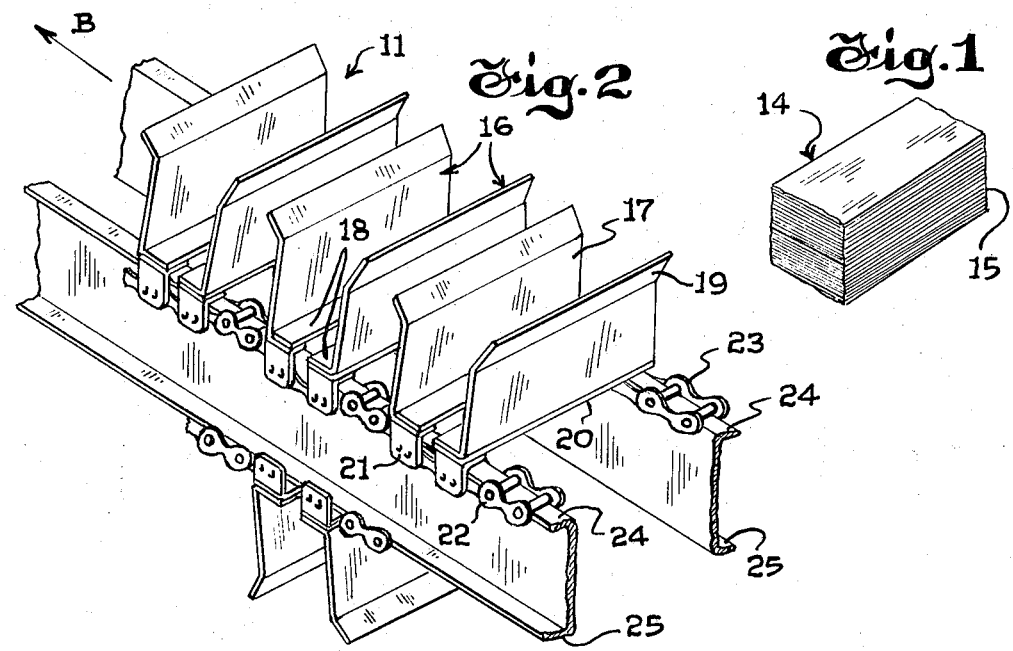
Fig. 2
Fig. 1

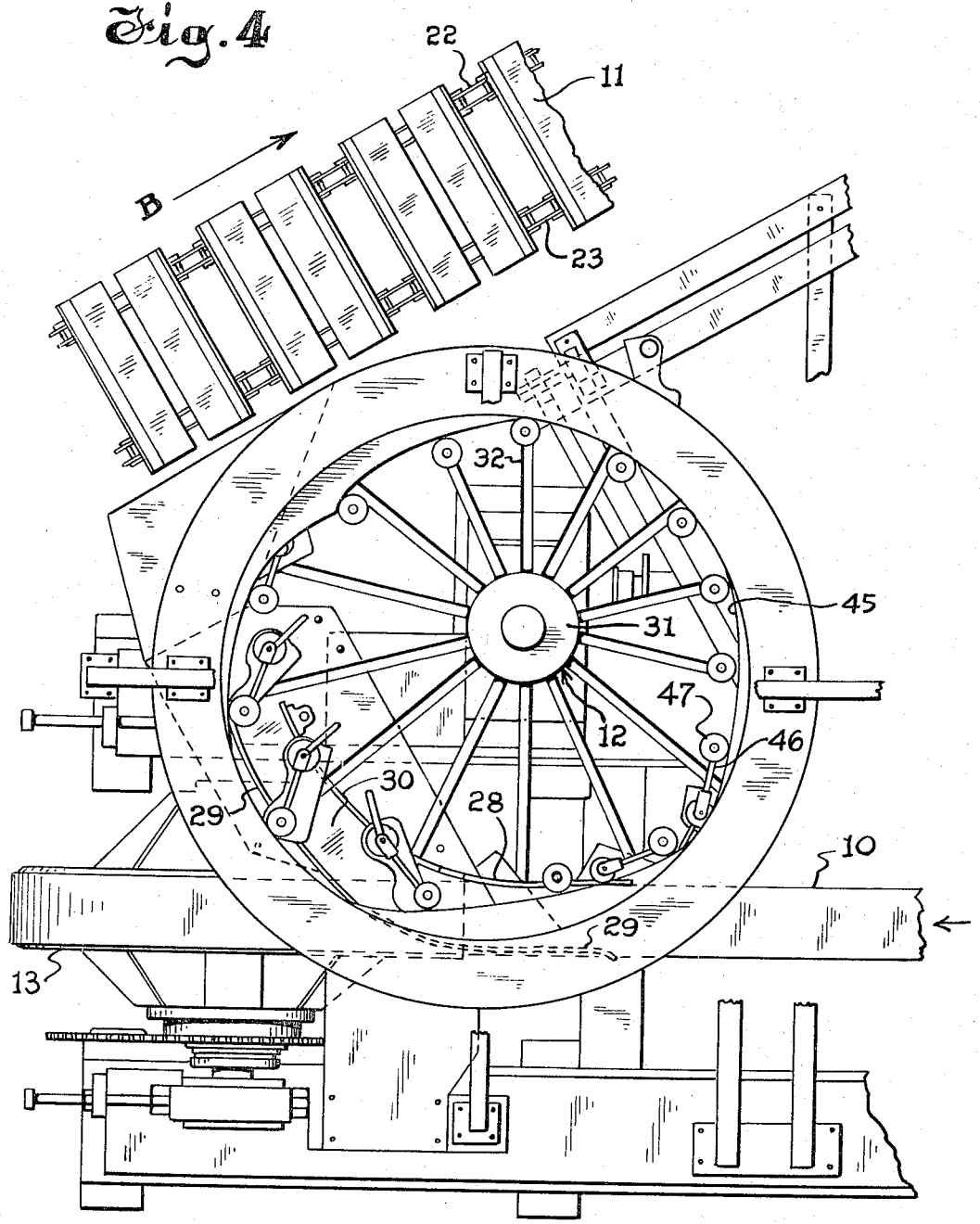

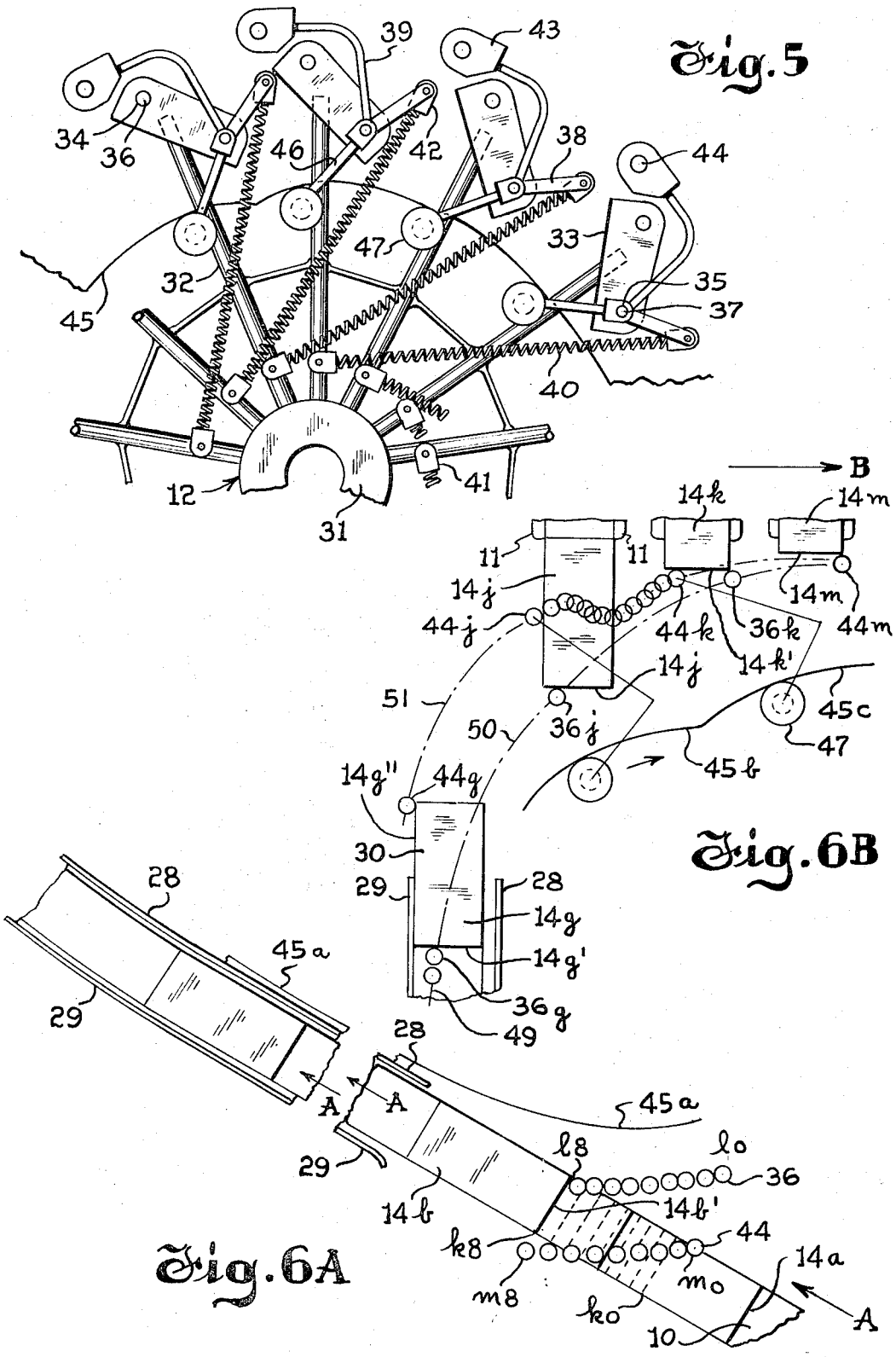

United States Patent Office 3,312,324
Patented Apr. 4, 1967

3,312,324
PAPERMAKING MACHINE
Charles T. Banks, Neenah, Wis., assignor to Kimberly-Clark Corporation, Neenah, Wis., a corporation of Delaware
Filed Apr. 15, 1966, Ser. No. 542,894
5 Claims. (Cl. 198—25)

My invention relates to papermaking machines and more particularly to article transferring apparatus specifically suitable for transferring stacks of paper tissue, for example, from one conveyor to another.

It is an object of the invention to provide an improved apparatus for transferring articles from one conveyor to another, particularly from a first conveyor belt to receptacles or buckets carried by a second conveyor belt. It is contemplated that the articles may be so transferred while the conveyor belts are in continuous motion.

It is a further, more particular object of the invention to provide such an apparatus which is specifically adapted for articles with rectangular cross-sections, vertically and horizontally. It is a more specific object of the invention to provide improved apparatus of this type which is effective for thrusting such articles longitudinally into the buckets while moving the articles transversely along with the buckets so that binding of the articles with respect to the buckets does not take place as they are transferred into the buckets.

It is a still more specific object of the invention to provide such improved apparatus comprising two series of pins, with driving mechanisms for the pins, so that a first series of pins are each operable to push such an article from an end thereof into a traveling bucket while each of the other series of pins is effective on a side of each article for causing it to move along with the buckets and is effective after one of the first series of pins moves out of contact with the end of the article being transferred to then become effective on the end of the article for completing the movement of the article into a bucket.

The invention consists of the novel constructions, arrangements and devices to be hereinafter described and claimed for carrying out the above stated objects, and such other objects, as will be apparent from the following description of a preferred form of the invention, illustrated with reference to the accompanying drawings, wherein:

FIG. 1 is a side perspective view of an article that may be used with the transferring apparatus of the invention;

FIG. 2 is a side perspective view of a plurality of article receiving buckets into which the articles may be moved;

FIG. 3 is a side elevational view of the transferring apparatus of the invention;

FIG. 4 is a plan view of the article transferring apparatus;

FIG. 5 is a plan view on an enlarged scale of a portion of the apparatus; and

FIGS. 6A and 6B are, respectively, beginning and end portions of the path of travel of the articles as they are moved by the apparatus from a conveyor belt into the buckets.

Like characters of reference designate like parts in the several views.

Referring now to the drawings, the transfer apparatus illustrated therein may be seen to comprise a movable belt 10, a series of movable buckets 11 and a transfer wheel 12. The belt 10 may have a width of approximately six inches, for example, and is disposed over a series of rotatable supporting drums, including the drum 13, so that the belt has a horizontal top stretch. The supporting drums for the belt 10 are driven by any suitable prime mover so that the belt moves in the direction indicated by the arrows A.

The transfer mechanism is particularly adapted for use with articles 14 (see FIG. 1) which have rectangular cross-sections both horizontally and vertically, such as stacks of interfolded facial tissues 15, for example. As an example, the belt 10 may constitute a conveyor belt in a compressor (not shown) of any suitable type for compressing the facial tissue stacks to reduce heights.

Each of the buckets 11 comprises a pair of sheet metal halves 16 having vertically extending sides 17, horizontally extending base portions 18 and outwardly flared top portions 19. Each of the bucket halves 16 is mounted on a sheet metal strip 20 which in turn is fixed to a pair of connecting links 21 of a pair of chains 22 and 23. A pair of tracks 24 and 25 for each chain 22 and 23 are provided on which the chains may slide for supporting the buckets 11 carried by the chain. The chains may be so supported and driven so that the buckets 11 move in the direction B (see FIGS. 2 and 4).

The transfer mechanism comprises a deck 26 which is suitably supported by means of a framework 27. Curved guides 28 and 29 are fixed with respect to the deck 26, and the guide 29 extends across the belt 10 as shown in FIG. 1. The guides 28 and 29 provide a curved path 30 between them for the articles 14, as will be hereinafter more fully described. The belt 10 extends across a portion of the deck 26 at one end of the path 30, and the buckets 11 are mounted to move transversely with respect to the other end of the path at the ends of the guides 28 and 29.

The transfer wheel 12 comprises a disc 31 having a plurality of radially extending spokes 32 fixed thereto. Each of the spokes 32 has a plate 23 fixed on one end having spaced openings 34 and 35 provided therein. A downwardly depending pin 36 is fixed within each of the openings 34, and the pin 36 is of such length that its end is located close to the deck 26.

A shaft 37 is rotatably mounted in the opening 35 in each plate 33 and has two lever arms 38 and 39 fixed to it. A spring 40 is connected between one of the spokes 32 and each of the arms 38, the connection being made by means of spring end retainers 41 and 42 having pivotal connections respectively with the spokes 32 and the end of the lever arm 38. Each of the lever arms 38 has a plate 43 mounted on its end, and a downwardly depending pin 44 extends through and is carried by each of the plates 43. The pins 44, like the pins 36, are of such length that their ends are adjacent the deck 26; however, the pins 44 differ in their movement from the pins 36 in that the pins 44 are at variable distances from the center of rotation of the wheel 12.

The movement of each of the pins 44 as it moves with the wheel 12 is controlled by means of a cam 45 which is fixed with respect to the supporting framework 27. Each of the shafts 37 has a lever arm 46 fixed to it, and each arm 46 carries a follower 47 on its end which is in contact with the inner surface of the cam 45 due to the action of the associated spring 40.

The wheel 12 is mounted on a vertical shaft 48 driven by a suitable drive mechanism 49 which is synchronized with the drive mechanisms for the buckets 11 and the conveyor belt 10.

In operation, the articles 14 are positioned on the belt 10 to be carried in a certain spaced relationship with respect to the pins 36 (and also with respect to the pins 44) which travel over the surface of the belt as the wheel 12 rotates. The articles 14 may, for example, be about 9¾ inches long and they are positioned with their long sides parallel with the edges of the belt 10; and the spacing between them, for example, may be about 4¼ inches. It will be understood, of course, that these dimensions may well be changed while yet operating within the principles of the invention. The articles 14 are so positioned on the belt 10 that the pins 44 pass between the articles while the pins 44 are at their fully extended positions from the center of rotation of the wheel 12.

Referring to FIG. 6A, two successive articles 14a and 14b, as carried by the belt 10, are illustrated. The end 14b' has progressively moved from the position $k_0$ to the position $k_8$ in the direction of movement A of the belt 10 (position $k_8$ corresponds with the beginning $k_0$ of a new series of positions of the articles). During this movement of the end 14b' of the article 14b, a pin 36 has moved from a position $l_0$ to a position $l_8$. In all of these positions, except the position $l_8$, the pin 36 is out of the path of movement of the articles 14; and, when the pins 36 contacts the end 14b' of the article 14b in position $l_8$, it begins to move the article 14b off of the belt 10, between the inner and outer guides 28 and 29, in the path 30 across the deck 26. During these movements of the article 14b, the article 14a follows the article 14b on the surface of the belt 10 at a fixed distance, and a pin 44 has the positions $m_0$ to $m_8$ corresponding to the positions $l_0$ to $l_8$ of the pin 36 and the positions $k_0$ to $k_8$ of the article end 14b'. Each of the positions $m_0$ to $m_8$ are between the articles 14a and 14b as they travel along with the belt 10, and the pin 44 has no effect at this time on the articles 14a and 14b.

The individual articles 14 travel in the curved path 30 between the inner and outer guides 28 and 29 across the upper surface of the deck 26, being propelled by the pins 36. The pins 44 carried by the arms 39 travel at this time exterior to the outer guide 29. When the articles 14 are approximately parallel with the bucket sides 17, the pins 44 then take effect on the article so as to propel them transversely, and the pins 44 and 36 together maintain the articles extending in the same direction as the sides 17 of the buckets 11. Referring to FIG. 6B, it will be observed that the article 14g has a pin 36g in the contact with its end 14g' and the pin 36g propels the article 14g longitudinally toward the buckets 11. A pin 44g at this time contacts the side 14g" of the article 14g and begins to move the front end of the article in the direction of movement of the buckets 11. The pin 36g travels in the circular path 50 and the pin 44g travels in the path 51 which deviates from circular; and during the proportions of the paths 50 and 51 as the article leaves the ends of the guides 28 and 29, the pin 36g propels the article 14g forwardly while the pin 44g is in contact with the side 14g" and propels the article transversely, until finally the article enters into the buckets 11. An article in this condition is illustrated as the article 14j; and a pin 36j is in contact with the end 14j' and a pin 44j is in contact with the side of the article 14j.

It will be observed that as an article 14 moves from its position 14g to a position 14j, the article has moved outwardly (toward the buckets 11) with respect to the propelling pin 44 and forwardly (in the direction of movement of the buckets 11) and with respect to the propelling pin 36. The pins 44 and 36 are so driven that the article 14 is traveling at the same speed as the buckets 11 in the direction B at the time of entry of the article 14 into a bucket 11. As soon as the article 14 has entered a bucket 11, the cam 45 is so effective as to move the propelling pin 44 away from the side edges of the article 14 so that the movement of the buckets 11 at this time is relied on to maintain the transverse movement (in the direction B) of the article 14 entering into a bucket 11.

As the buckets 11 continue their movement in the direction B, the wheel 12 continues its rotation, and a pin 36 carried by the wheel 12 continues to move an article 14 farther into the bucket 11 in which it has entered. Such a pin 36k is illustrated in connection with an article 14k that is nearly completely within the bucket 11 in which it was previously thrust. Between the positions 14j and 14k, the pin 36 has been solely effective on the article 14 for moving it farther into its bucket 11, and the corresponding pin 44 has been out of contact with the article 14, but the pin 44 has moved from the side of the article to its end 14k' so that at this time the pin 44k initiates contact with the article end 14k'. It will be noted that as the pin 36 moves from a position 36j to a position 36k, it moves faster and farther in the direction B than does the article with which it is in contact, due to the fact that the buckets 11 travel at a slower speed than the peripheral speed of the pins 36 in their circular path 50. The pin 36k, therefore, moves off the article 14k while the pin 44k moves into contact with the article end 14k'.

The pin 44k contacts the end 14k' of the article 14k; and, as the article moves to its position 14m with movement of the buckets 11, the pin 44 moves farther toward the buckets and thrusts the article 14 all the way into its bucket. The movement of the pin 44 is at a faster speed than the speed of movement of the buckets 11 in the direction B; and, therefore the particular pin 44m in contact with the article 14m moves off the end 14m' of the article 14m when the article is all the way within its bucket 11.

Since the pins 36 are on fixed arcs with respect to the center of rotation of the wheel 12, the path 50 is at a fixed radius with respect to the wheel center. The path 51 of movement of the pins 44, however, is at a variable distance with respect to the center of the wheel 12; and the particular portion of the cam 45, which causes the pins 44 to swing across the belt 10 between spaced articles 14, is an indented portion 45a (see FIG. 6A). The cam 45 is provided with a high-rise portion 45b (see FIG. 6B) extending inwardly toward the center of rotation of the wheel 12 which, in effect, retards the movement of a pin 44, since the center of the shaft 37 precedes its follower 47 in the direction of rotation of the wheel 12, for the purpose of causing the pin 44 to engage with the side of an article 14, to propel the article transversely from position 14g to 14j, and to disengage the pin 44 from the side of the article and to engage the end of the article. The high-rise portion 45b of the cam terminates at a dwell portion 45c of the cam, and the roller 47 for the pin 44k is on the portion 45c at the time the pin 44k contacts with the end 14k of the article 14 and moves the article farther into the bucket. The dwell portion 45c rises slightly, that is, it comes closer to the center of the wheel 12 for continued rotation of the wheel, so that the pin 44k, for example, is moved closer to the path 50 on continued rotation of the wheel 12.

The article transferring apparatus above described advantageous functions, utilizing only two pins for each article 14, to transfer the articles from a plane surfaced conveyor belt 10 into closed sided buckets 11, while maintaining the articles 14 parallel with the sides of the buckets for easy entry into the buckets.

I wish it to be understood that the invention is not to be limited to the specific constructions, arrangements and devices shown and described, except only insofar as the claims may be so limited, as it will be understood to those skilled in the art that changes may be made without departing from the principles of the invention.

What is claimed is:

1. In transferring apparatus for articles having side and end surfaces, the combination of first and second spaced conveyors, a deck across which the articles may be moved from said first conveyor to said second conveyor, a transfer wheel which has a first series of spaced pusher elements and which is rotatably mounted whereby the pusher elements may engage the articles on said first conveyor and push the articles across said deck onto said second conveyor, a second series of pusher elements carried by said transfer wheel and movable with respect to the transfer wheel so that their path may be non-circular, and cam means effective for moving said second series of pusher elements with respect to said transfer wheel as the transfer wheel rotates so that the second series of pusher elements may first engage a side of each of said articles and subsequently engage an end of the article for completing the movement of the article onto said second conveyor.

2. In article transferring apparatus as set forth in claim 1, said second series of pusher elements each being swingably mounted with respect to said transfer wheel, said cam means including a cam and a cam follower connected by means of an arm with each of said second series of pusher elements for moving the pusher element with respect to the transfer wheel, and spring means for holding each of said cam followers in contact with said cam.

3. In article transferring apparatus as set forth in claim 1, said cam means including a cam having a non-circular portion effective on said second series of pusher elements for causing the pusher elements to have a rapid movement across said first conveyor so that they may pass between spaced ones of said articles on said first conveyor and having a second non-circular portion effective for causing said second series of pusher elements to transfer from a side of each of said articles to an end of the article so as to complete the movement of the article onto said second conveyor.

4. In article transferring apparatus as set forth in claim 1, said second conveyor comprising a plurality of article receiving buckets for receiving the articles being thrust longitudinally therein and said second series of pusher elements acting on the sides of said articles effective to maintain the articles parallel with the sides of said buckets as the first series of pusher elements push the articles into the buckets.

5. In article transferring apparatus as set forth in claim 4, said cam means including a stationary cam having a non-circular portion effective for retarding the movement of said second series of pusher elements as the articles enter said buckets so that the second series of pusher elements change contact from sides of said articles to ends of said articles to complete the movement of the articles into said buckets on continued movement of said transfer wheel.

References Cited by the Examiner

UNITED STATES PATENTS 3,164,240 12/1965 Banks _____ 198—25
3,189,155 6/1965 Everman _____ 198—25

FOREIGN PATENTS 1,228,179 3/1960 France.

EVON C. BLUNK, *Primary Examiner.*

R. E. AEGERTER, *Assistant Examiner.*